W. S. HUDSON. Improvement in Locomotives.
No. 129,232. Patented July 16, 1872.

2 Sheets--Sheet 1.

Witnesses,
A. Hoermann
C. C. Livings

Inventor,
W. S. Hudson
by his attorney
J. L. Stetson

AM. PHOTO-LITHOGRAPHIC CO. N.Y. (OSBORNE'S PROCESS.)

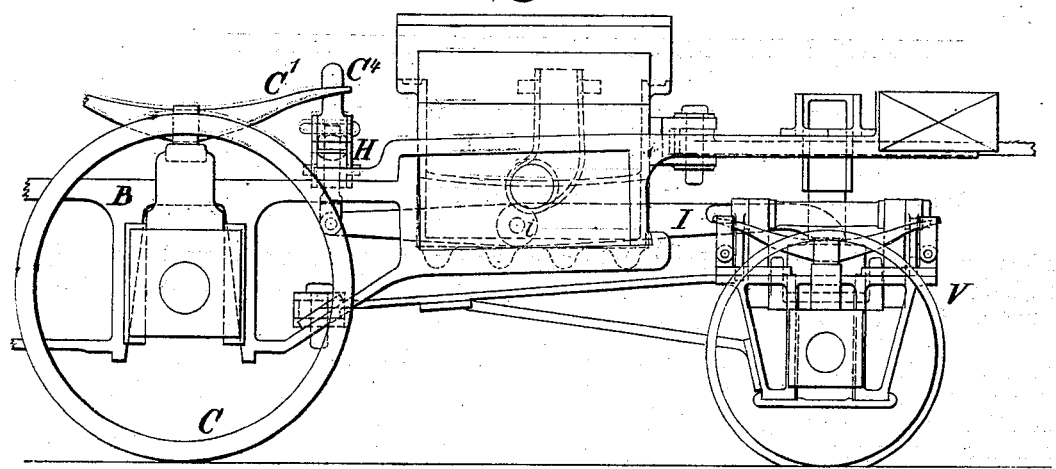
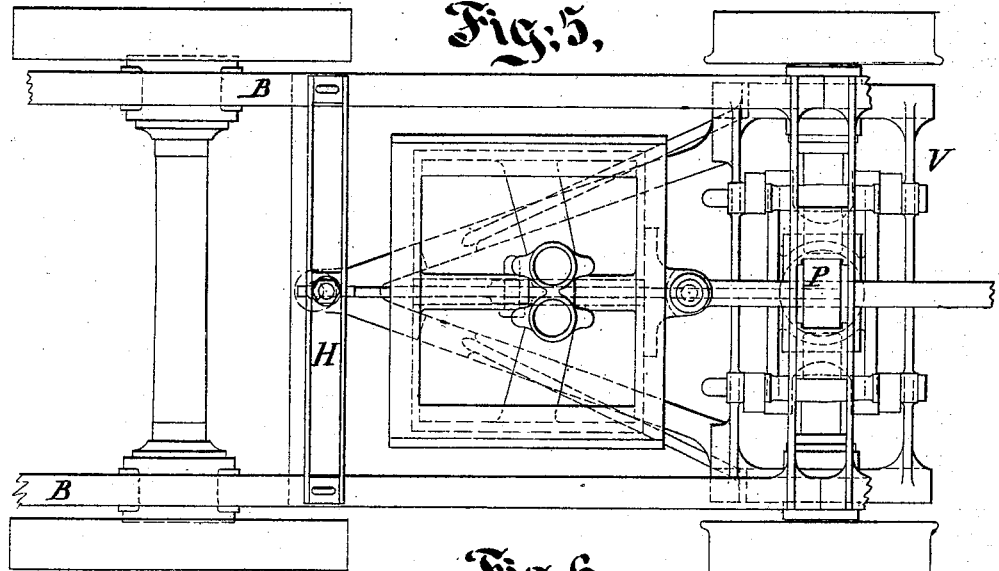
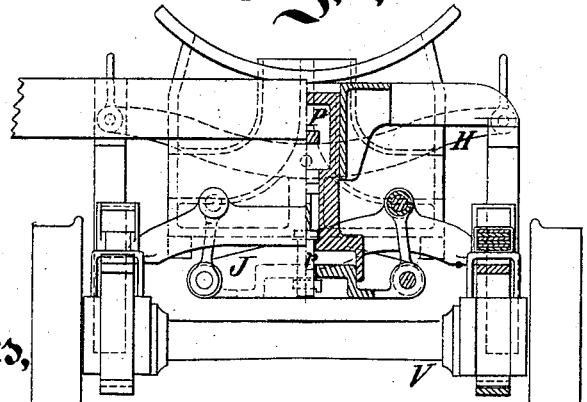

UNITED STATES PATENT OFFICE.

WILLIAM S. HUDSON, OF PATERSON, NEW JERSEY.

IMPROVEMENT IN LOCOMOTIVES.

Specification forming part of Letters Patent No. 129,232, dated July 16, 1872.

Specification describing certain Improvements in Locomotives, invented by WILLIAM S. HUDSON, of Paterson, in the county of Passaic and State of New Jersey.

The invention relates to oblique equalizing-levers, which support a part of the weight of the locomotive, and also to a peculiarity of the construction of a part at the center of a truck or half truck, and the arrangement of the draw-bar to pass through the same.

There have been many attempts, by myself and others, to attain such a construction as will support the locomotive efficiently and allow the greatest freedom of movement to its wheels. In passing over imperfect joints or other roughnesses in the track it is desirable to distribute the shocks, by equalizing-levers, from one pair of wheels to another or others, so that more than one spring may be available at once to absorb the concussions. This has long been done by various arrangements of the levers. My present invention effects the ends in a very desirable manner, and, while avoiding the use of a cross-equalizer, it attains a part of the effect thereof by equalizing from each side obliquely to a central point.

It has long been common to provide a draw-bar, not only at the rear end, but also at the front end of the locomotive, adapted to serve in connecting the locomotive to a train when it is obliged to work by pulling backward; and it has long been common to provide some means of securing the center-pin of a truck or half truck of a locomotive, so that, in case of running off the track or other accident, the truck will remain connected. I effect this latter object by extending the draw-bar through an opening in the center-block of the truck, which opening is not a mere split, but is a complete loop or bow, so as to loosely inclose the draw-bar above and below.

The following is a description of what I consider the best means of carrying out the invention.

The accompanying drawing forms a part of this specification, and represents the novel parts, with as much of the ordinary parts as is necessary to indicate their relations thereto.

Figure 1:
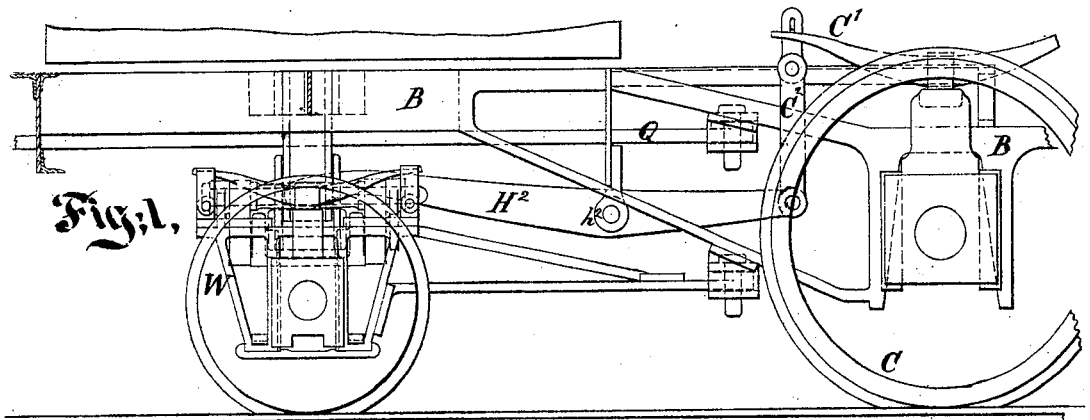
Figure 2:
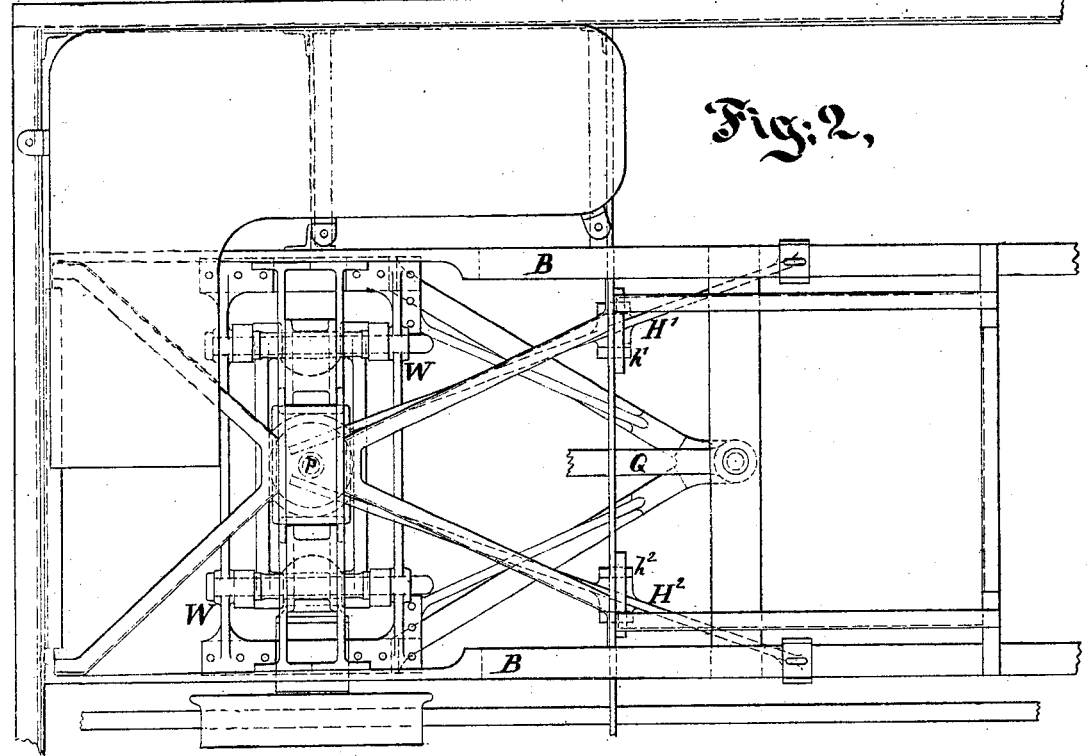
Figure 3:
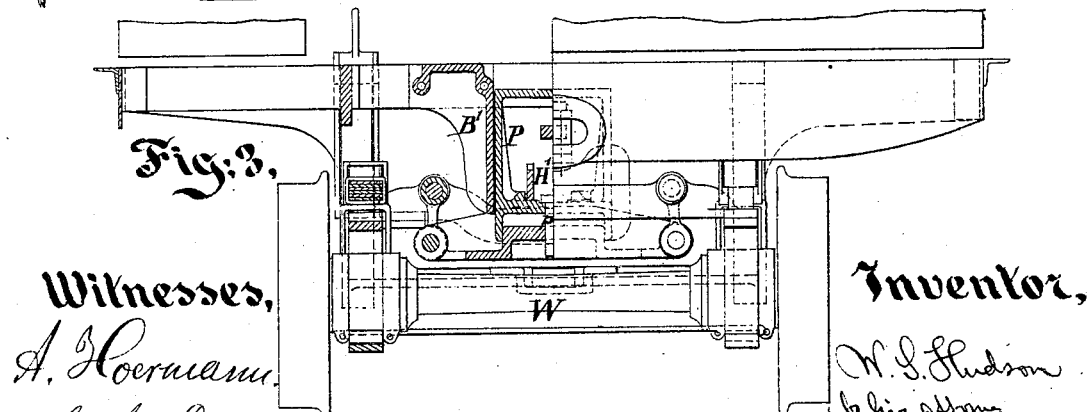

Figure 1 is a side elevation of a portion of the running-gear at the rear end of the structure. It represents the rim of the rear driver on the right, and the rim of a smaller wheel, and other principal parts of a half truck, which is under a rear extension of the main frame, which frame serves to support the tank and fuel analogous to an ordinary tender. The tank over this half truck and the main body of the locomotive further forward are not fully represented in any of the figures; but they may be of any ordinary or suitable character. Fig. 2 is a plan view of the same parts. Fig. 3 is a rear elevation, half in section, and representing the same parts. The remaining figures represent the work at the opposite end—the forward end—of the locomotive. Fig. 4 is a side elevation. Fig. 5 is a plan view; and Fig. 6 is a front elevation, half in section.

Similar letters of reference indicate like parts in all the figures.

B is the main framing of the locomotive. C C are driving-wheels. The pair represented in Fig. 1 is the hindmost or rear pair of drivers. The pair represented in Figs. 4 and 5 is the forward pair of drivers. These may be the only ones; or there may be one pair, or, possibly, more than one, between them, the drivers being always coupled together by side-rods, as will be understood. Referring to Fig. 1, $C^1$ is one of the ordinary stout half-elliptic springs over the bearings of the rear drivers, and $C^2$ is the link-compounder, as represented, which depends from the rear end thereof, and transmits the bearing or strain therefrom to the forward end of the lever below. The levers below are marked $H^1$ $H^2$. Both are shown in the plan view, Fig. 2. They extend obliquely inward from the rear ends of the springs $C^1$ $C^1$ of the rear drivers to a point close to the center of a single Bissell truck. I have represented all the ordinary mechanism of this truck by the letter W. It is represented quite fully in the figures, and is sufficiently described, except with reference to the peculiarities involved in this invention, by saying that it has but a single pair of wheels, and is provided with the swing motion, swinging on short links, as shown in the patent to A. F. Smith, dated February 11, 1862. The Bissell radius-arm extends forward in the form of a triangular frame, and is pivoted, by a pin, to the main framing B, as represented. The novelty in the truck lies in receiving the equalizing-levers H¹ H² in oblique positions very near the center, and within what may be called the center-pin. The center is formed within an open casting, which is guided within a stout rigid framing, B', which is fixed to and forms a part of the main framing B. The sides are plane, and the entire casting P is rectangular in its horizontal section and open, so that the draw-bar Q may move freely through it. The oblique equalizing-levers H¹ H² turn on centers $h^1$ $h^2$ constructed and firmly supported under the main framing B, as represented. The axes of their bearings are oblique to the length of the levers, and stand in a line extending directly across the framing. The consequent curves described by each end of each lever are in the planes forward and aft, the same as if the levers were hung in the ordinary fore-and-aft positions. The rear bearings of these levers H¹ H² are within the central casting or block P over the truck, and as near to the center as is practicable, while leaving room between them for the small central confining-bolt $p$. The locomotive bears on the system of levers at the points $h^1$ $h^2$; and these bearings are widely enough separated, or are each far enough out from the central line of the machine to give the character of side-bearings to the support thereby afforded. The other end of the locomotive may be supported at the center as I have done it in this construction, and will presently proceed to describe, and the locomotive will ride properly. In other words, my arrangement allows the bearing on the rear truck to be actually central while preserving to the main structure the character of side bearings. In the case of the employment of three or more pairs of driving-wheels there are equalizing-levers at the sides between the rear drivers represented in Fig. 1 and the drivers next forward thereof.

Good mechanics will not need to be reminded that the system of equalizing-levers must not be extended at the sides so as to include the forward pair of drivers. In other words, the equalizing-system at the rear must be somewhere distinctly separated from the system of equalizing-levers at the front. The front system is an ordinary center-bearing system. The rear system is a novel and peculiar side-bearing system, operating with the effect on the truck of a center bearing, and with the effect on the locomotive of a side bearing only, with the side bearing at the points $h^1$ $h^2$ further inward toward the center line than usual.

When, in the rapid motion of the locomotive, a roughness is encountered by the rear driving-wheel C, so as to tend to cause its spring C¹ to bend violently, it distributes the shock through the lever H', not to the opposite driving-wheels, but to the truck W, by throwing the shock on the center thereof. To the extent that the springs of the truck may yield, there is a slight motion transmitted through the other oblique equalizing-lever H² to the opposite driving-wheel; but the effect of this is very different from that of an ordinary cross-equalizer, which conveys the shock directly across; and when, at a brief interval, later, one wheel of the half truck encounters the roughness, the truck rocks as much as may be required, agitating its center, of course, to half the extent, and transmitting that agitation through both the oblique equalizing-levers H¹ H² alike. The center casting or block P is made with an opening through it, and the draw-bar Q stands and plays forward and back in the opening thus provided. The top of the casting P, being closed so that the metal is extended across over this opening, causes the casting P and its attachments, and thus the whole truck, to be loosely locked to the locomotive by the aid of the draw-bar. In case of derailment or other accident, the truck is permanently hung to the casting or open block P, by the union of the swing-beam J thereto, through the central bolt $p$, and the casting P is reliably connected to the locomotive by the locking effect of the draw-bar Q extending through the opening of the block P.

Referring to Figs. 4, 5, and 6, which represent the part at the forward end of the locomotive, here the Bissell half truck and its springs and parts, represented by the single letter V, may be of the ordinary construction, as shown in the Smith patent of 1862, before referred to, except at the center. The center casting or block and its relation to the forward draw-bar is the same as has been already described for the corresponding parts at the rear, except that it has to receive but a single equalizing-lever, I. At this end of the locomotive there is an ordinary cross-lever, which I generally term a cross-equalizer, which is represented at H, and a fore-and-aft single lever, as indicated at I. The cross-equalizer H is suspended to the forward ends of the forward springs C¹ by means of ordinary links C⁴, and the fore-and-aft central equalizer I turns on the center $i$ and bears, in the center casting P, over the forward truck, as will be obvious. The connection of the rear end of the equalizer I to the cross-equalizer H has a nut and jam-nut to allow of adjustment from time to time, to compensate for the partial failure of any spring or springs and to allow for a completely satisfactory adjustment of the positions of the parts at any time.

The operation of the parts at the forward end of the locomotive is closely similar to that of any other center-bearing half Bissell truck with a central equalizing-lever, but the peculiarity due to the open-work construction of the casting P with its closed top and the passage of the draw-bar Q through it, as shown at either end of the structure, is realized when the locomotive is thrown from the rails.

I claim as my invention—

1. The oblique equalizing-levers H¹ H² supporting the locomotive on (practically) side-bearings $h^1\ h^2$ and converging to the center line of the truck or half truck W, and arranged to serve relatively to said truck and to the springs C' of one or more pairs of the driving-wheels C, as herein specified.

2. The open casting P having a close top and forming the central pivot of a truck, in combination with the draw-bar Q, playing through the same and adapted to serve therewith, as herein set forth.

In testimony whereof I have hereunto set my name in presence of two subscribing witnesses.

WM. S. HUDSON.

Witnesses:
ARNOLD HOERMANN,
C. C. LIVINGS.